(12) United States Patent
Lv et al.

(10) Patent No.: US 9,578,364 B2
(45) Date of Patent: Feb. 21, 2017

(54) INTERNET PROTOCOL TELEVISION SERVER AND METHOD FOR PLAYING ADVERTISEMENTS DURING RECORDED CONTENT

(71) Applicant: Huawei Device Co., Ltd., Shenzhen (CN)

(72) Inventors: Xiaoqiang Lv, Beijing (CN); Lei Wang, Beijing (CN); Wenmei Gao, Beijing (CN); Shunan Fan, Beijing (CN); Yahui Wang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 184 days.

(21) Appl. No.: 14/283,434

(22) Filed: May 21, 2014

(65) Prior Publication Data

US 2014/0259057 A1    Sep. 11, 2014

Related U.S. Application Data

(63) Continuation of application No. PCT/CN2013/076087, filed on May 22, 2013.

(30) Foreign Application Priority Data

May 23, 2012    (CN) .......................... 2012 1 0161497

(51) Int. Cl.
*H04N 21/2668*    (2011.01)
*H04N 21/2387*    (2011.01)
(Continued)

(52) U.S. Cl.
CPC ........ *H04N 21/2668* (2013.01); *H04N 21/218* (2013.01); *H04N 21/2387* (2013.01);
(Continued)

(58) Field of Classification Search
CPC ............ H04N 21/2668; H04N 21/6175; H04N 21/2387; H04N 21/6125; H04N 21/218; H04N 21/25866; H04N 21/64322; H04N 21/437; H04N 21/4135; H04N 21/6587; H04N 21/25891; H04N 21/23424; H04N 21/2747; H04N 21/812; H04N 21/26258
(Continued)

(56) References Cited

U.S. PATENT DOCUMENTS 8,359,616 B2 *    1/2013    Rosenberg ............. G06Q 30/02
725/115
8,571,934 B2 *    10/2013    Rosenberg ......... G06Q 30/0241
705/14.4
(Continued)

FOREIGN PATENT DOCUMENTS

CN    101103629 A    1/2008
CN    101350937 A    1/2009
(Continued)

OTHER PUBLICATIONS

Foreign Communication From A Counterpart Application, European Application No. 13793129.1 Extended European Search Report dated Nov. 26, 2014, 8 pages.
(Continued)

*Primary Examiner* — Hoang-Vu A Nguyen-Ba
(74) *Attorney, Agent, or Firm* — Conley Rose, P.C.

(57) ABSTRACT

An Internet Protocol television (IPTV) server includes: a subscriber file managing module configured to store a subscriber file of a recorded program, where the subscriber file of the recorded program includes advertisement information in the recorded program; a controlling module configured to obtain a playback request of the recorded program or an advertisement playback policy request of the recorded program, obtain the advertisement information in the recorded program from the subscriber file managing module according-
(Continued)

ing to the playback request or the advertisement playback policy request, obtain an advertisement playback policy from an advertisement managing module according to the advertisement information, and send the advertisement playback policy to the subscriber terminal; and the advertisement managing module configured to determine the advertisement playback policy of the recorded program according to the advertisement information sent by the controlling module and a preset policy, and send the advertisement playback policy to the controlling module.

16 Claims, 7 Drawing Sheets

(51) Int. Cl.
| | |
|---|---|
| H04N 21/61 | (2011.01) |
| H04N 21/437 | (2011.01) |
| H04N 21/6587 | (2011.01) |
| H04N 21/643 | (2011.01) |
| H04N 21/258 | (2011.01) |
| H04N 21/41 | (2011.01) |
| H04N 21/218 | (2011.01) |
| H04N 21/81 | (2011.01) |
| H04N 21/234 | (2011.01) |
| H04N 21/262 | (2011.01) |
| H04N 21/2747 | (2011.01) |

(52) U.S. Cl.
CPC . *H04N 21/23424* (2013.01); *H04N 21/25866* (2013.01); *H04N 21/25891* (2013.01); *H04N 21/26258* (2013.01); *H04N 21/2747* (2013.01); *H04N 21/4135* (2013.01); *H04N 21/437* (2013.01); *H04N 21/6125* (2013.01); *H04N 21/6175* (2013.01); *H04N 21/64322* (2013.01); *H04N 21/6587* (2013.01); *H04N 21/812* (2013.01)

(58) Field of Classification Search
USPC ...... 725/34, 36, 32; 705/14.49, 14.55, 14.67
See application file for complete search history.

(56) References Cited

U.S. PATENT DOCUMENTS

| | | | |
|---|---|---|---|
| 8,849,100 B2* | 9/2014 | Haberman | H04N 7/165 386/249 |
| 2005/0060229 A1 | 3/2005 | Riedl et al. | |
| 2010/0031291 A1 | 2/2010 | Iwata et al. | |
| 2010/0138298 A1* | 6/2010 | Fitzgerald | G06F 21/88 705/14.53 |
| 2010/0180289 A1* | 7/2010 | Barsook | G06Q 30/02 725/29 |
| 2010/0269132 A1 | 10/2010 | Foti | |
| 2010/0332313 A1* | 12/2010 | Miller | G06F 17/30867 705/14.44 |
| 2011/0082915 A1* | 4/2011 | Carr | H04N 21/25891 709/219 |
| 2011/0142417 A1 | 6/2011 | Wilson et al. | |
| 2011/0170538 A1 | 7/2011 | Liu | |
| 2011/0176789 A1 | 7/2011 | Karaoguz et al. | |
| 2012/0096486 A1 | 4/2012 | Stallard et al. | |
| 2012/0116883 A1 | 5/2012 | Asam et al. | |

FOREIGN PATENT DOCUMENTS

| | | |
|---|---|---|
| CN | 101631229 A | 1/2010 |
| CN | 101631299 A | 1/2010 |
| CN | 101882289 A | 11/2010 |
| CN | 102137291 A | 7/2011 |
| CN | 102158749 A | 8/2011 |
| EP | 2282525 A1 | 2/2011 |

OTHER PUBLICATIONS

Partial English Translation and Abstract of Chinese Patent Application No. CN101882289, Part 1, Aug. 5, 2014, 5 pages.
Partial English Translation and Abstract of Chinese Patent Application No. CN101882289, Part 2, Aug. 5, 2014, 4 pages.
Foreign Communication From A Counterpart Application, PCT Application No. PCT/CN2013/076087, English Translation of International Search Report dated Aug. 29, 2013, 2 pages.
Foreign Communication From A Counterpart Application, PCT Application No. PCT/CN2013/076087, Written Opinion dated Aug. 29, 2013, 6 pages.
Foreign Communication From A Counterpart Application, European Application No. 13793129.1, European Office Action dated Jul. 11, 2016, 7 pages.
Partial English Translation and Abstract of Chinese Patent Application No. CN101631229, Sep. 20, 2016, 8 pages.

* cited by examiner

INTERNET PROTOCOL TELEVISION SERVER AND METHOD FOR PLAYING ADVERTISEMENTS DURING RECORDED CONTENT

CROSS-REFERENCE TO RELATED APPLICATIONS

This application is a continuation of International Patent Application No. PCT/CN2013/076087, filed on May 22, 2013, which claims priority to Chinese Patent Application No. 201210161497.6, filed on May 23, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of Internet Protocol television (IPTV) technologies, and in particular, to an IPTV server and a method for playing recorded content.

BACKGROUND

IPTV is a new technology that uses a broadband cable television network and integrates multiple technologies such as the Internet, multimedia, and entertainment to provide multiple interactive services including digital television for a home. It can adapt very well to a trend of rapid network development nowadays and use network resources efficiently. IPTV has an interactive characteristic that is very flexible, and because of an inherent advantage of symmetric interaction of an Internet Protocol (IP) network, a program of the IPTV may be published within the network in multiple manners, such as broadcast, multicast, and unicast. Multiple functions, such as electronic menu, program recording, real-time fast-forward, rewind, terminal account and charging management, and program scheduling, may be implemented very flexibly. In addition, other Internet-based content services may also be provided, such as online games, email, and electronic financing.

In IPTV, a personal video recorder (PVR) service is provided. A PVR is a technology of establishing mass buffers and media repositories by using a hard disk as a storage medium, so as to control and manage a program.

The PVR may be classified into a 1PVR and an nPVR according to a difference in a storage location of a recorded program, where the 1PVR indicates that a recorded broadcast program is stored in a consumer domain or on a subscriber terminal of a subscriber, and the nPVR indicates that a recorded broadcast program is stored on a network device of a service provider (a service provider domain). A broadcast program that is recorded by using the PVR may appear in a personalized menu of a subscriber, so that the subscriber can watch the program after recording ends.

However, in an existing nPVR technology, control cannot be properly performed over playback of an advertisement in a recorded program, and personalized advertisement content cannot be provided for a subscriber.

SUMMARY

A technical problem to be solved by embodiments of the present invention is to provide an IPTV server and a method for playing recorded content.

In order to solve the foregoing technical problem, according to one aspect, an embodiment of the present invention provides an IPTV server, including: a subscriber file managing module configured to store a subscriber file of a recorded program, where the subscriber file of the recorded program includes advertisement information in the recorded program; a controlling module configured to obtain a playback request of the recorded program or an advertisement playback policy request of the recorded program, where the playback request or the advertisement playback policy request is sent by a subscriber terminal; obtain the advertisement information in the recorded program from the subscriber file managing module according to the playback request or the advertisement playback policy request; obtain an advertisement playback policy from an advertisement managing module according to the advertisement information; and send the advertisement playback policy to the subscriber terminal, so that the subscriber terminal correspondingly plays an advertisement according to the advertisement playback policy when playing the recorded program; and the advertisement managing module configured to determine the advertisement playback policy of the recorded program according to the advertisement information sent by the controlling module and a preset policy, and send the advertisement playback policy to the controlling module.

According to another aspect, an embodiment of the present invention further provides a subscriber terminal, including: a request sending module configured to generate and send, to an IPTV server, a playback request of a recorded program or an advertisement playback policy request of a recorded program; a policy receiving module configured to receive an advertisement playback policy that is obtained, according to the playback request or the advertisement playback policy request, and sent by the IPTV server; and a playing module configured to correspondingly play an advertisement according to the advertisement playback policy when playing the recorded program.

According to another aspect, an embodiment of the present invention further provides a method for playing recorded content, where the method is applied to an IPTV server, and includes: obtaining a playback request of a recorded program or an advertisement playback policy request of a recorded program, where the playback request or the advertisement playback policy request is sent by a subscriber terminal, and obtaining advertisement information in the recorded program according to the playback request or the advertisement playback policy request; and determining an advertisement playback policy of the recorded program according to the advertisement information and a preset policy, and sending the advertisement playback policy to the subscriber terminal, so that the subscriber terminal correspondingly plays an advertisement according to the advertisement playback policy when playing the recorded program.

According to another aspect, an embodiment of the present invention further provides a method for playing recorded content, where the method is applied to an IPTV subscriber terminal, and includes: generating and sending, to an IPTV server, a playback request of a recorded program or an advertisement playback policy request of a recorded program; receiving an advertisement playback policy that is obtained, according to the playback request of the recorded program or the advertisement playback policy request of the recorded program, and sent by the IPTV server; and correspondingly playing an advertisement according to the advertisement playback policy when playing the recorded program.

Implementation of the embodiments of the present invention has the following beneficial effects:

In the embodiments of the present invention, a corresponding advertisement playback policy is obtained according to a request sent by a subscriber terminal, and an advertisement is played according to the advertisement playback policy when a recorded program is played. Because the advertisement playback policy is developed under control of a server side, the server side can play a corresponding advertisement in a targeted manner when playing the recorded program.

BRIEF DESCRIPTION OF THE DRAWINGS

To describe the technical solutions in the embodiments of the present invention or in the prior art more clearly, the following briefly introduces accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION

Figure 1:
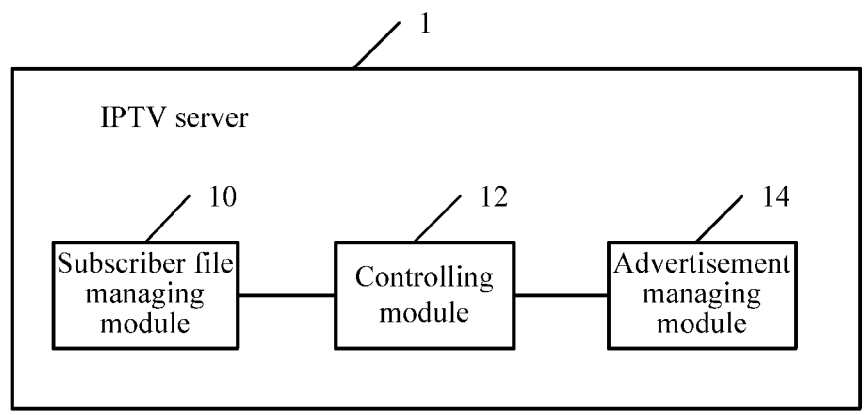
FIG. 1 is a specific schematic composition diagram in an IPTV server according to an embodiment of the present invention.

The following clearly describes the technical solutions in the embodiments of the present invention with reference to the accompanying drawings in the embodiments of the present invention. The embodiments to be described are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, because an advertisement playback policy is developed under control of a server side, the server side can control an advertisement that is played when playing a recorded program. That is, when playing the recorded program, the server side can control playback of an advertisement in the recorded program. In this way, playback of an advertisement can be more targeted.

For example, when a recorded program is replayed, an advertisement that a subscriber may like is dynamically pushed according to a current preference of the subscriber; or when it is found that a version of a recorded advertisement changes, an advertisement of a later version is played; or when it is found that when a recorded program is replayed, advertisement playback validity time of an original recorded program that is concluded by an operator expires, other advertisement content is selected and played. Other factors may also cause substitution of a new advertisement. For example, when a minor is watching a recorded program, advertisement content that is not suitable for a minor to watch and is inserted into the recorded program, such as cigarette and alcohol, needs to be replaced.

In the embodiments of the present invention, in IPTV, when a program is recorded, statistics are collected on advertisement information (for example, a channel identifier, a program identifier, advertisement start time, and an advertisement storage address) that is recorded together with program content, and collected information is stored in a subscriber file (for example, a PVR file of a subscriber). When the recorded program is replayed, the advertisement information in the subscriber file is obtained, and it is determined whether substitution of a new advertisement is required; and if substitution is required, an advertisement server is requested to deliver a new advertisement. After the advertisement delivered by the advertisement server is played completely, playback of the recorded program continues.

In a different specific embodiment, an advertisement playback plan (policy) may be determined first during replay, and substitution advertisement content is obtained from an advertisement server in a replay process. Alternatively, an advertisement playback plan associated with a recorded program may be updated periodically, and all advertisement information is downloaded locally in advance, so that no interaction is required with a network side when the program is replayed. The following describes details in different embodiments.

As shown in FIG. 1, which is a specific exemplary composition diagram of an IPTV server according to an embodiment of the present invention, a server 1 includes: a subscriber file managing module 10 configured to store a subscriber file of a recorded program, where the subscriber file of the recorded program includes advertisement information of the recorded program. The subscriber file may be a PVR file, where the file records information such as some recording-related settings of a subscriber and a recording record. In addition, the subscriber file may also include information such as a subscriber purchase record. Moreover, in the embodiment of the present invention, during program recording, the subscriber file managing module is also responsible for storing advertisement information of the program to a corresponding subscriber file. That is, a controlling module 12 further includes a recording controlling module configured to request, during program recording, obtaining the advertisement information in the program from an advertisement managing module. The subscriber file managing module 10 is further configured to store the advertisement information in the program to a subscriber file that stores the program. The foregoing advertisement information generally indicates information related to the advertisement, such as a channel identifier, a program identifier, and advertisement start time. Specific advertisement content is generally obtained from a corresponding server by using an advertisement address.

The controlling module 12 is configured to obtain a playback request of the recorded program or an advertisement playback policy request of the recorded program, where the playback request or the advertisement playback policy request is sent by a subscriber terminal; obtain the advertisement information in the recorded program from the subscriber file managing module 10 according to the playback request or the advertisement playback policy request; obtain an advertisement playback policy from an advertisement managing module 14 according to the advertisement information; and send the advertisement playback policy to the subscriber terminal, so that the subscriber terminal correspondingly plays an advertisement according to the advertisement playback policy when playing the recorded program. That is, the advertisement information that is in the subscriber file (for example, a PVR file) and is corresponding to the program is sent to the advertisement managing module. Moreover, information such as a preference and purchase record of the subscriber may be sent together with the advertisement information.

The advertisement managing module 14 is configured to determine the advertisement playback policy of the recorded program according to the advertisement information sent by the controlling module 12 and a preset policy, and send the advertisement playback policy module 12 to the controlling module.

The preset policy may include information related to the subscriber, or may also include information related to an advertisement provider, so as to determine whether to replace recorded advertisement content in the recorded program, and which advertisement is to be used for substitution. For example, when the preset policy includes information related to an advertisement provider, the information may be a validity period of an advertisement; and when it is found that the validity period of the advertisement expires, an advertisement playback policy determined according to the information may be that the advertisement is not to be played or is replaced with a new advertisement. Alternatively, the information is version information of an advertisement; and when it is found that an advertisement in a recorded program is not an advertisement of the latest version, an original advertisement is replaced with an advertisement of a later version. When the preset policy includes information related to the subscriber, the information may be historical purchase information of the subscriber. For example, if a subscriber A recently purchases a bicycle by using television shopping, an advertisement playback policy determined according to the information may be replacing an original advertisement with an advertisement about a bicycle-related accessory device, such as a helmet and an elbow pad. Alternatively, the information is permission information of the subscriber. For example, a current login subscriber is the subscriber is a minor; accordingly, an advertisement playback policy determined according to the information may be, for example, replacing an advertisement that is not suitable for a minor to watch and is in a recorded program with an advertisement that is suitable for a minor to watch.

The advertisement playback policy at least includes the following information: an original advertisement identifier, a target advertisement identifier, target advertisement time, and a target advertisement address. The original advertisement identifier refers to an identifier corresponding to an advertisement during program recording; and the target advertisement identifier refers to an identifier of an advertisement when the recorded program is replayed. When the original advertisement identifier and the target advertisement identifier in the advertisement playback policy are different, it indicates that in a current advertisement playback policy, a new advertisement is substituted and is to be played during replay. The target advertisement address is a storage address of advertisement content, and a subscriber terminal can obtain specific content of the advertisement according to the address. The target advertisement time is time when the advertisement is played normally, so that during replay, a subsequent part of the program is played normally after the advertisement is played completely.

Figure 2:
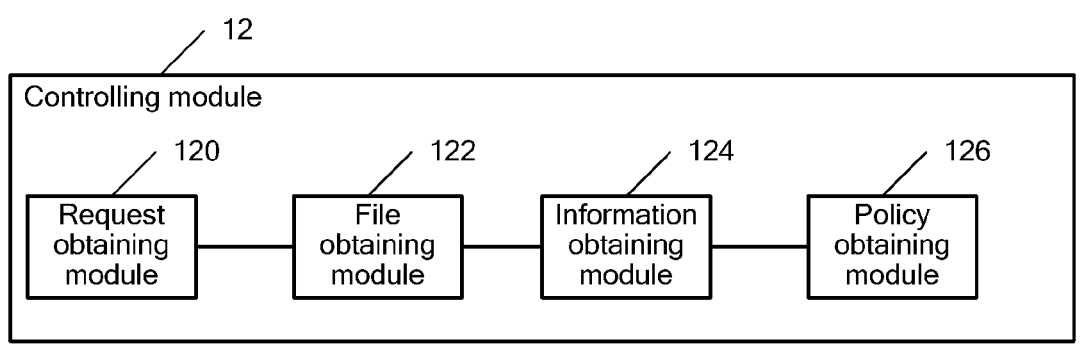
FIG. 2 is a specific schematic composition diagram of a controlling module according to an embodiment of the present invention.

As shown in FIG. 2, the controlling module 12 may include: a request obtaining module 120 configured to obtain the playback request of the recorded program or the advertisement playback policy request of the recorded program, where the playback request or the advertisement playback policy request is sent by the subscriber terminal; a file obtaining module 122 configured to obtain the subscriber file of the recorded program from the subscriber file managing module according to the playback request or the advertisement playback policy request; an information obtaining module 124 configured to perform authentication on a subscriber according to the subscriber file, and when the authentication passes, obtain the advertisement information in the recorded program; and a policy obtaining module 126 configured to obtain the advertisement playback policy from the advertisement managing module according to the advertisement information, and send the advertisement playback policy to the subscriber terminal.

Certainly, the foregoing subscriber file managing module, controlling module, and advertisement managing module may be functional modules in the IPTV server, or may also be one or more independent servers.

Figure 3:
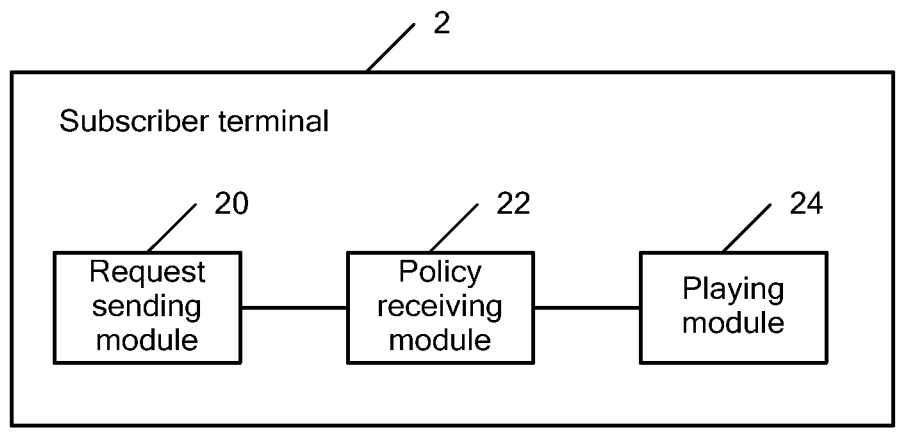
FIG. 3 is a specific schematic composition diagram of a subscriber terminal according to an embodiment of the present invention.

Correspondingly, as shown in FIG. 3, FIG. 3 is a specific schematic composition diagram of a subscriber terminal according to an embodiment of the present invention. A subscriber terminal 2 communicates with the IPTV server 1, and the subscriber terminal 2 may include: a request sending module 20 configured to generate and send, to the IPTV server, a playback request of a recorded program or an advertisement playback policy request of a recorded program; a policy receiving module 22 configured to receive an advertisement playback policy that is obtained, according to the playback request or the advertisement playback policy request, and sent by the IPTV server; and a playing module 24 configured to correspondingly play an advertisement according to the advertisement playback policy when playing the recorded program.

The advertisement playback policy at least includes the following information: an original advertisement identifier, a target advertisement identifier, target advertisement time, and a target advertisement address. For a specific meaning, reference may be made to the description in the foregoing embodiments, and explanations are not repeatedly described herein or in following embodiments.

Figure 4:
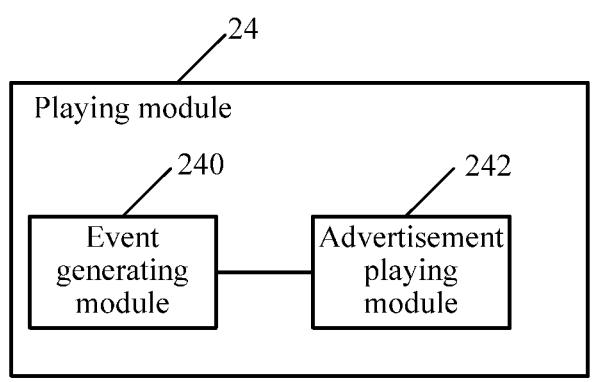
FIG. 4 is a specific schematic composition diagram of a playing module according to an embodiment of the present invention.

As shown in FIG. 4, the playing module 24 may include: an event generating module 240 configured to generate advertisement playback event processing information according to the advertisement playback policy; and an advertisement playing module 242 configured to correspondingly play the advertisement according to the advertisement playback event processing information when the recorded program is played.

The advertisement playback event processing information may include a processing handle identifier of each advertisement, an associated television program identifier, a timer for triggering advertisement playback, a storage address of advertisement content, and time of the advertisement. During specific implementation, the advertisement playback event processing information may be recorded in a form of an advertisement playback event processing list.

It can be known from the description of the foregoing embodiment that, an advertisement playback policy can control playback of an advertisement in a recorded program. Because the advertisement playback policy is developed by a server side, the server side can play a corresponding advertisement in a targeted manner when playing the recorded program. Moreover, the advertisement playback policy is generated by considering information of three aspects, that is, a request of a subscriber terminal, determination performed by a server, and the recorded program, so that eventual advertisement playback can well reflect a factor such as a personalized requirement of a subscriber.

Figure 5:
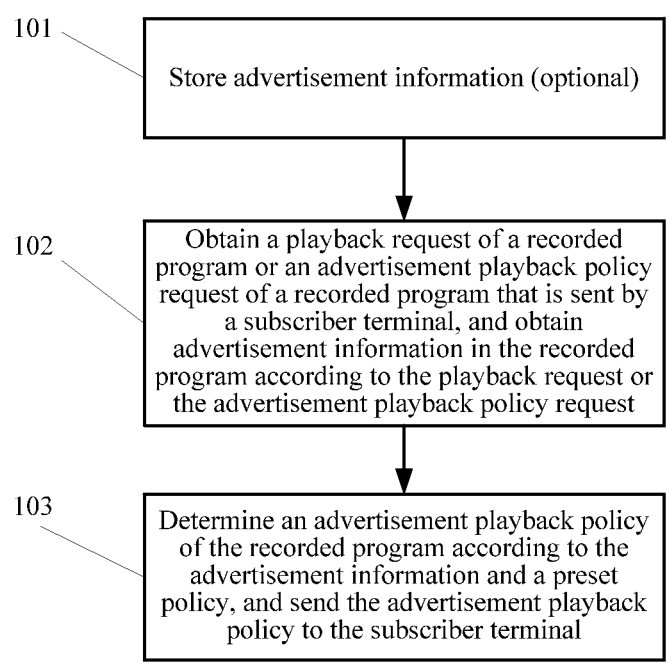
FIG. 5 is a specific schematic flowchart of a method for playing recorded content according to an embodiment of the present invention.

As shown in FIG. 5, FIG. 5 is a specific schematic flowchart of a method for playing recorded content according to an embodiment of the present invention. The method is applied to an IPTV server and includes the following steps:

101: Record a program; when an advertisement is detected during program recording, obtain advertisement information of the advertisement; store the advertisement information to a subscriber file that stores the program; and store the subscriber file. This step is an optional step.

102: Obtain a playback request of the recorded program or an advertisement playback policy request of the recorded program, where the playback request or the advertisement playback policy request is sent by a subscriber terminal, and obtain advertisement information in the recorded program according to the playback request or the advertisement playback policy request.

The obtaining advertisement information in the recorded program according to the playback request or the advertisement playback policy request may include: obtaining the subscriber file of the recorded program according to the playback request or the advertisement playback policy request; and performing authentication on a subscriber according to the subscriber file, and when the authentication passes, obtaining the advertisement information in the recorded program.

103: Determine an advertisement playback policy of the recorded program according to the advertisement information and a preset policy, and send the advertisement playback policy to the subscriber terminal, so that the subscriber terminal correspondingly plays an advertisement according to the advertisement playback policy when playing the recorded program. The advertisement playback policy at least includes the following information: an original advertisement identifier, a target advertisement identifier, target advertisement time, and a target advertisement address.

Figure 6:
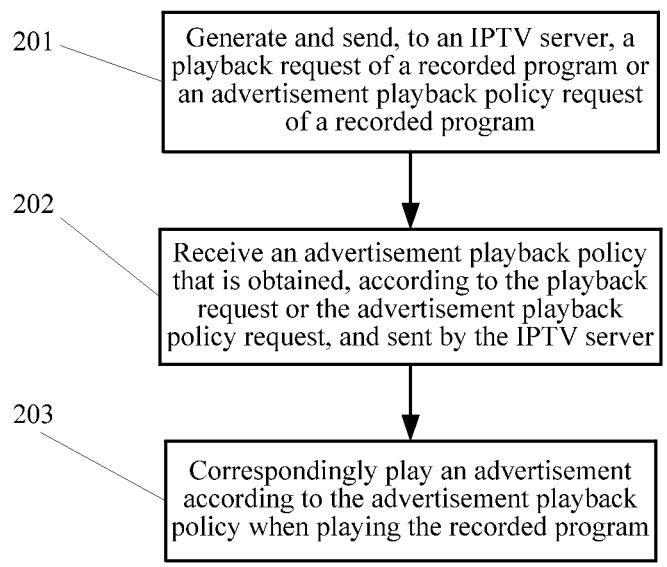
FIG. 6 is another specific schematic flowchart of a method for playing recorded content according to an embodiment of the present invention.

Correspondingly, as shown in FIG. 6, FIG. 6 is another specific schematic flowchart of a method for playing recorded content according to an embodiment of the present invention. The method is applied to an IPTV subscriber terminal and includes:

201: Generate and send, to an IPTV server, a playback request of a recorded program or an advertisement playback policy request of a recorded program.

202: Receive an advertisement playback policy that is obtained, according to the playback request or the advertisement playback policy request, and sent by the IPTV server, where the advertisement playback policy may include one or more of the following information: an original advertisement identifier, a target advertisement identifier, target advertisement time, and a target advertisement address.

203: Correspondingly play an advertisement according to the advertisement playback policy when playing the recorded program. This step may specifically include: generating advertisement playback event processing information according to the advertisement playback policy; and correspondingly playing the advertisement according to the advertisement playback event processing information when playing the recorded program.

The advertisement playback event processing information may include a processing handle identifier of each advertisement, an associated television program identifier, a timer for triggering advertisement playback, a storage address of advertisement content, and time of the advertisement.

To further describe the foregoing method, the following embodiments are further described by using an interaction process between a server side and a terminal side. It should be noted that in examples of FIG. 7 to FIG. 9, for a specific structure and function of an IPTV server, reference may be made to the foregoing embodiment shown in FIG. 1. Certainly, for a terminal side, it only needs to receive a message from and send a message to the IPTV server, and does not need to learn specific composition of the IPTV server. During interaction between the IPTV server and a subscriber terminal, different modules inside the IPTV server may handle specific tasks according to a condition.

Figure 7:
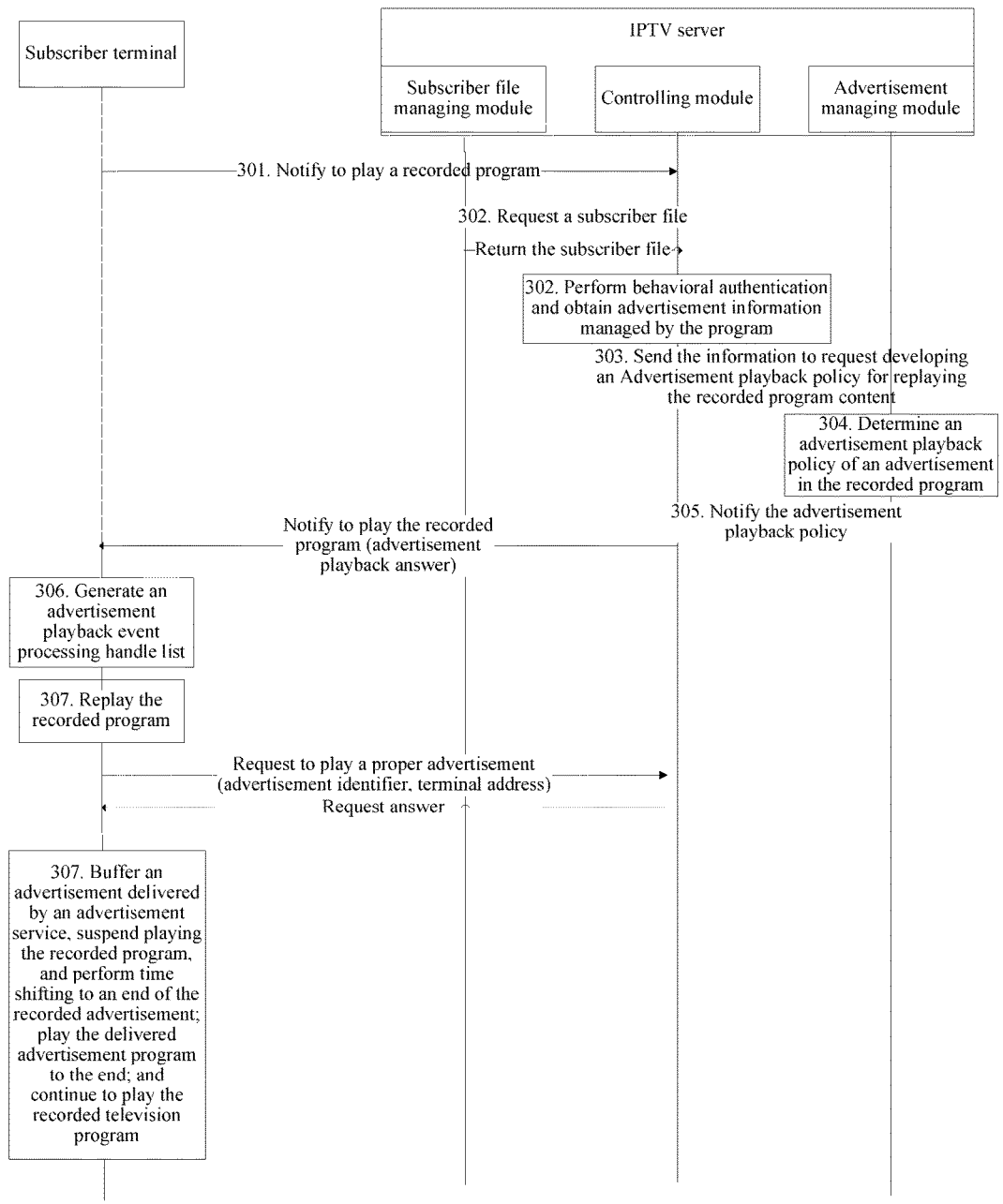
FIG. 7 is a specific schematic flowchart of a method for playing recorded content when advertisement content is obtained separately according to an embodiment of the present invention.

As shown in FIG. 7, FIG. 7 is a schematic processing flowchart for replaying a recorded program, which includes the following steps:

301: A subscriber terminal notifies a controlling module in an IPTV server when playing a recorded program. For example, the notification may be a playback request of the recorded program. The notification may carry a parameter, such as a name of the program.

302: The controlling module in the IPTV server requests obtaining a subscriber file from a subscriber file managing module; performs authentication on a subscriber according to the subscriber file returned by the subscriber file managing module; and after the authentication passes, obtains recorded advertisement information corresponding to the recorded program. Further, information such as information related to a subscriber preference and historical purchase record information that is recorded in the subscriber file may also be obtained.

303: The controlling module sends the information to an advertisement managing module after obtaining the information (which includes but is not limited to the recorded advertisement information), and requests the advertisement managing module to develop an advertisement playback policy that is used when content of the recorded program is replayed.

304: The advertisement managing module determines, according to a preset policy, the advertisement playback policy in the recorded program after receiving the request.

In the embodiment of the present invention, the advertisement playback policy indicates a manner and content, which are developed according to known advertisement information, for playing an advertisement when the recorded program is played.

305: The advertisement managing module notifies the subscriber terminal of the developed advertisement playback policy by using the controlling module. For example, content of the policy includes information such as an original advertisement identifier, a target advertisement identifier, target advertisement time, and a target advertisement address.

306: The subscriber terminal generates an advertisement playback event processing list (or called an advertisement playback event processing handle list) according to the received advertisement playback policy. When an advertisement is inserted in a program, each advertisement is corresponding to one processing event handle, and each processing event handle may be triggered by the following triggering timer.

That is, each entry in the list represents playback information related to one advertisement, and each entry may include the following content: Eventhander ID: an identifier of a processing handle; Contentref: an identifier of an associated television program; Avoketimer: a triggering timer (indicating when to trigger the timer during the program); Advs-URL: a storage address of advertisement content; and Shift-time: time of time shifting required by television content (time of the original advertisement).

The subscriber terminal can play the advertisement correctly by using content defined in the advertisement playback event processing list.

307: The subscriber terminal starts to play the content of the recorded program, and correspondingly plays an advertisement according to the advertisement playback event processing list, which may be specifically:

1: The subscriber terminal checks the advertisement playback event processing list to find a first to-be-processed event (for example, a first advertisement) corresponding to the program, and starts the Avoketimer.

2: When the Avoketimer expires, suspend the program and connect to the Advs-URL to obtain advertisement content.

Specifically, the obtaining advertisement content according to the Advs-URL (that is, the address of the advertisement) in the advertisement playback event processing list may be:

The subscriber terminal requests, by using the controlling module, the storage address of the advertisement to deliver the advertisement content, where the request may carry the following parameters: a target advertisement identifier, a target advertisement address, and a program identifier.

The subscriber terminal starts to buffer an advertisement media stream from the target advertisement storage address after receiving an acknowledgement answer of the advertisement managing module. It should be noted that the Avoketimer may be started slightly ahead of start time of the recorded advertisement in the program content, so that the terminal can seamlessly and smoothly complete switching of advertisement playback after completing the buffering.

3: The subscriber terminal suspends playing the content of the recorded program and plays the buffered content of the target advertisement. After the content of the buffered target advertisement is played completely, the subscriber terminal performs time shifting to play the content of the recorded program to an end of the recorded advertisement content that is replaced; continues to play the content of the recorded program; starts next event processing Avoketimer according to the advertisement playback event processing list; and cyclically performs steps 1 to 3.

Figure 8:
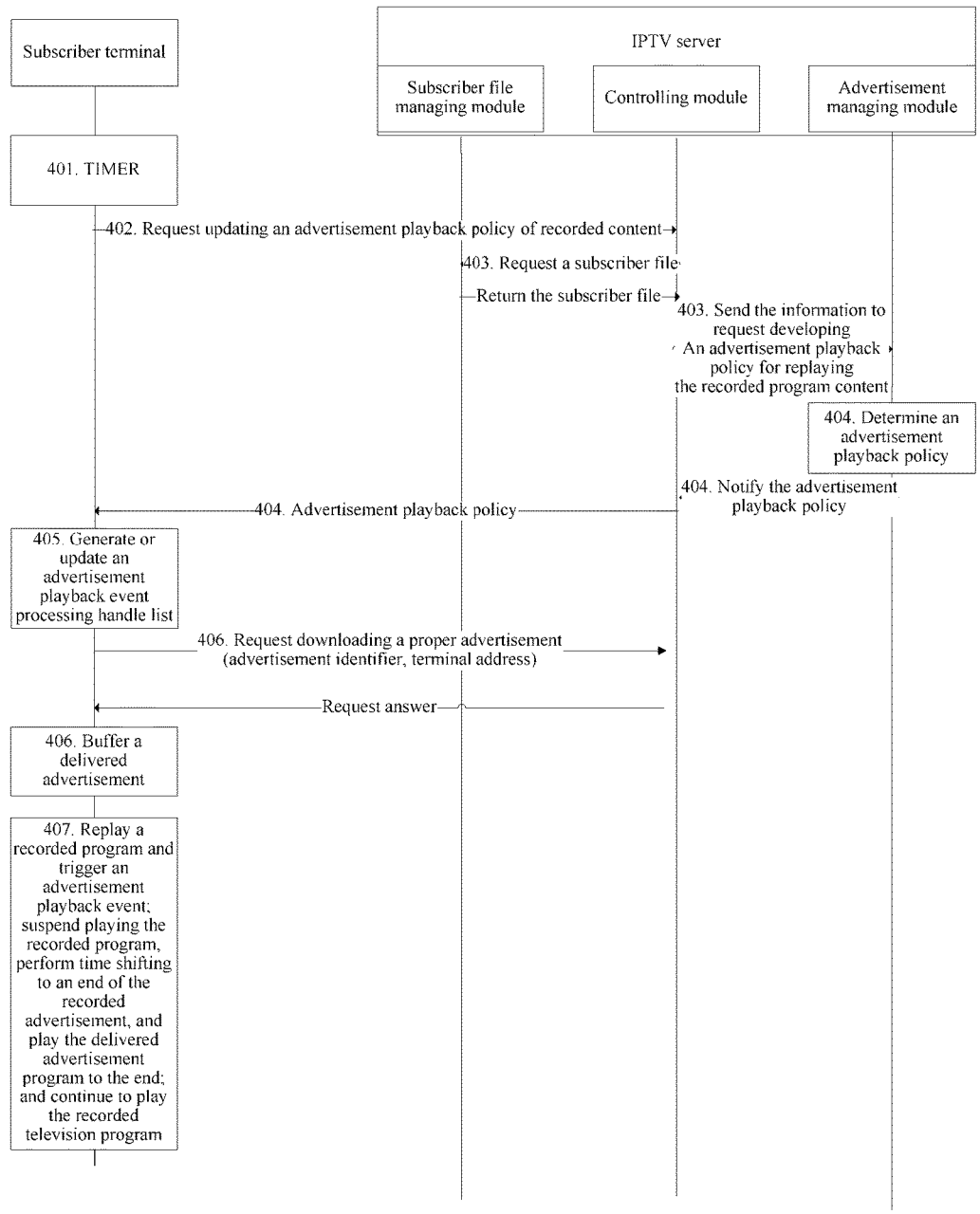
FIG. 8 is a specific schematic flowchart of a method for playing recorded content when advertisement content is obtained in batches according to an embodiment of the present invention.
Figure 9:
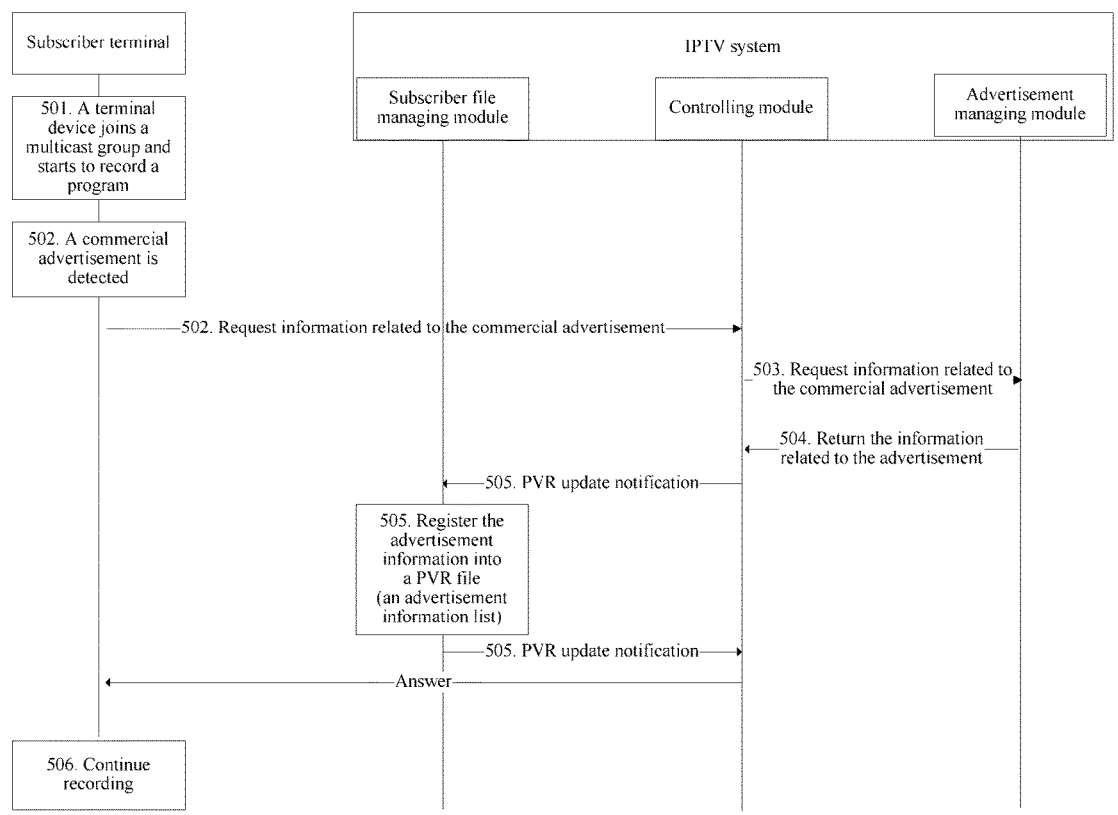
FIG. 9 is a specific schematic flowchart of a method for recording program content according to an embodiment of the present invention.

In the embodiment shown in FIG. 7, when the advertisement content is obtained, the advertisement content is obtained according to a requirement when the program is played. Certainly, a manner for obtaining all advertisement content at a time may also be used. In this case, after the triggering timer in the advertisement playback event processing list expires, advertisement content does not need to be requested from a network side, and a substitution advertisement may be directly played locally. As shown in FIG. 8, the method includes the following process:

401: Set a timer on a subscriber terminal, where a function of the timer is to: in a case where the subscriber terminal has a recorded program, periodically update advertisement content that is played during the recorded program.

402: After the timer expires, the subscriber terminal sends a request for updating an advertisement playback policy of the recorded program to a controlling module in an IPTV server.

403: The controlling module requests a subscriber file of a subscriber corresponding to the terminal from a subscriber file managing module. The subscriber file has information such as PVR record information, preference information, and a purchase record of the subscriber. All these information may affect an advertisement playback policy developed by an advertisement managing module. The controlling module sends the obtained information to the advertisement managing module, and requests the advertisement managing module to develop an advertisement playback policy corresponding to the recorded program.

404: The advertisement managing module develops a proper advertisement playback policy according to the information sent by the controlling module and sends the advertisement playback policy to the subscriber terminal by using the controlling module.

405: The subscriber terminal generates an advertisement playback event processing list (which is the same as that in the embodiment shown in FIG. 7) after receiving the advertisement playback policy.

406: Request, according to the advertisement playback event processing list and by using the controlling module, downloading advertisement content (where all advertisements are downloaded at a time), and correspondingly buffer a delivered advertisement.

407: Replay a recorded television program, and when an event in the advertisement playback event processing list is triggered (which is the same as that in the embodiment shown in FIG. 7), suspend playing the television program and switch to playing the advertisement content. After the advertisement content is played completely, perform time shifting on the recorded television program to an end of the recorded advertisement content that is replaced, and continue to play the recorded television program.

Certainly, in the foregoing embodiment of the present invention, the subscriber file stores advertisement information. That is, during program recording, recording is performed in a manner shown in FIG. 9.

501: A subscriber terminal joins a multicast group and starts to record a program.

502: In the recording process, when it is detected that a commercial advertisement is inserted in a playback process of the television program, send information (for example, a channel identifier, a program identifier, advertisement start time, and the like) about the commercial advertisement inserted in the television program to a controlling module in an IPTV server. The advertisement start time indicates offset for starting to play the advertisement with respect to program playback. For example, the advertisement is played about 10 minutes after the television program starts to play.

503: The controlling module in the IPTV server requests, according to the received commercial advertisement information, detailed information about the commercial advertisement from an advertisement managing module after receiving the commercial advertisement information reported by the subscriber terminal.

504: The advertisement managing module obtains the detailed information about the commercial advertisement and notifies the controlling module after receiving the request. The detailed information may include one or more of the following content: a channel identifier corresponding to the advertisement, a program identifier, advertisement start time, advertisement time, an advertisement category (program-related or time-related), an advertisement playback priority, and the like.

505: After receiving the detailed information about the advertisement, the controlling module requests the subscriber file managing module to register the detailed information about the advertisement into the subscriber file, for example, a PVR file of the subscriber file.

506: After the foregoing operation is completed, continue to record program content until information about a next commercial advertisement is detected, and repeat steps 501 to 505.

It can be known from the foregoing description that, in the embodiment of the present invention, a corresponding advertisement playback policy is obtained according to a request sent by a subscriber terminal, and an advertisement is played according to the advertisement playback policy when a recorded program is played. Because the advertisement playback policy is developed under control of a server side, the server side can play a corresponding advertisement in a targeted manner when playing the recorded program. That is, the server side can dynamically adjust an advertisement inserted in recorded content (for example, push an advertisement suitable for a subscriber according to a personal preference of the subscriber, or after a validity period of an advertisement that is recorded together with a television program expires, adjust the advertisement to other advertisement information when replaying the recorded program), which improves control and flexibility for playing an advertisement in the recorded content.

A person of ordinary skill in the art can understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disk, a read-only memory (ROM), a random access memory (RAM), or the like.

The foregoing description is merely exemplary embodiments of the present invention, but is not intended to limit the scope of the claims of the present invention. Therefore, equivalent changes made according to the claims of the present invention shall fall within the scope of the present invention.

What is claimed is:

1. An Internet Protocol television (IPTV) server, comprising:
    a memory;
    a processor coupled to the memory and configured to store a subscriber file of a recorded program in the memory, wherein the subscriber file of the recorded program comprises advertisement information associated with the recorded program;
    a receiver coupled to the processor and configured to obtain a playback request of the recorded program from a subscriber terminal associated with the subscriber file, wherein the processor is further configured to:
        identify advertisement information in the recorded program according to the playback request; and
        generate an advertisement playback policy according to the following information: the advertisement information, a subscriber preference associated with the subscriber terminal, a historical purchase record associated with the subscriber terminal, and a preset policy, wherein the preset policy includes information related to at least one of a validity period of the advertisement, version information of the advertisement, and permission information of a subscriber of the subscriber terminal; and
    a transmitter coupled to the processor and configured to send the advertisement playback policy to the subscriber terminal, wherein the subscriber terminal is configured to play an advertisement according to the advertisement playback policy when playing the recorded program.

2. The IPTV server according to claim 1, wherein the processor is further configured to:
    perform authentication on a subscriber according to the subscriber file; and
    identify the advertisement information in the recorded program when the subscriber is authenticated.

3. The IPTV server according to claim 1, wherein the advertisement playback policy comprises an original advertisement identifier, a target advertisement identifier, target advertisement time, and a target advertisement address.

4. The IPTV server according to claim 1, wherein the advertisement information is identified during program recording when advertisement content is detected in the program.

5. A subscriber terminal, comprising:
    a processor;
    a transmitter coupled to the processor and configured to transmit, to an Internet Protocol television (IPTV) server, a playback request of a recorded program; and
    a receiver coupled to the processor and configured to receive an advertisement playback policy from the IPTV server,
    wherein the advertisement playback policy is based on the following information: advertisement information associated with the recorded program, a subscriber preference associated with the subscriber terminal, a historical purchase record associated with the subscriber terminal and a preset policy,
    wherein the preset policy includes information related to at least one of a validity period of the advertisement, version information of the advertisement, and permission information of a subscriber of the subscriber terminal,
    wherein the processor is configured to play an advertisement according to the advertisement playback policy when playing the recorded program.

6. The subscriber terminal according to claim 5, wherein the advertisement playback policy comprises an original advertisement identifier, a target advertisement identifier, target advertisement time, and a target advertisement address.

7. The subscriber terminal according to claim 6, wherein the advertisement playback event processing information comprises a processing handle identifier of each advertisement, an associated television program identifier, a timer for triggering advertisement playback, a storage address of advertisement content, and time of the advertisement.

8. The subscriber terminal according to claim 5, wherein the processor is further configured to:
   generate advertisement playback event processing information according to the advertisement playback policy; and
   play the advertisement according to the advertisement playback event processing information when the recorded program is played.

9. A method for playing recorded content, wherein the method is applied to an Internet Protocol television (IPTV) server, the method comprising:
   obtaining a playback request of a recorded program from a subscriber terminal;
   obtaining advertisement information in the recorded program according to the playback request;
   generating an advertisement playback policy of the recorded program according to the following information: the advertisement information, a subscriber preference associated with the subscriber terminal, a historical purchase record associated with the subscriber terminal, and a preset policy, wherein the preset policy includes information related to at least one of a validity period of the advertisement, version information of the advertisement, and permission information of a subscriber of the subscriber terminal; and
   sending the advertisement playback policy to the subscriber terminal, wherein the subscriber terminal is configured to play an advertisement according to the advertisement playback policy when playing the recorded program.

10. The method according to claim 9, further comprising:
    performing authentication on a subscriber according to the subscriber file; and
    identifying the advertisement information in the recorded program when the authentication passes.

11. The method according to claim 10, wherein the advertisement playback policy comprises an original advertisement identifier, a target advertisement identifier, target advertisement time, and a target advertisement address.

12. The method according to claim 9, wherein before obtaining the playback request of the recorded program, the method further comprises:
    recording a program;
    obtaining the advertisement information of an original advertisement when the advertisement is detected during program recording; and
    storing the advertisement information to the subscriber file that stores the program.

13. A method for playing recorded content, wherein the method is applied to an Internet Protocol television (IPTV) subscriber terminal, the method comprising:
    generating a playback request of a recorded program;
    sending, to an IPTV server, the playback request of the recorded program;
    receiving an advertisement playback policy from the IPTV server, wherein the advertisement playback policy is based on the following information: advertisement information associated with the recorded program, a subscriber preference associated with the IPTV subscriber terminal, a historical purchase record associated with the subscriber terminal, and a preset policy, wherein the preset policy includes information related to at least one of a validity period of the advertisement, version information of the advertisement, and permission information of a subscriber of the subscriber terminal; and
    playing an advertisement according to the advertisement playback policy when playing the recorded program.

14. The method according to claim 13, wherein the advertisement playback policy comprises an original advertisement identifier, a target advertisement identifier, target advertisement time, and a target advertisement address.

15. The method according to claim 13, further comprising:
    generating advertisement playback event processing information according to the advertisement playback policy; and
    playing the advertisement according to the advertisement playback event processing information when playing the recorded program.

16. The method according to claim 15, wherein the advertisement playback event processing information comprises a processing handle identifier of each advertisement, an associated television program identifier, a timer for triggering advertisement playback, a storage address of advertisement content, and time of the advertisement.

* * * * *